United States Patent [19]

Schmidt

[11] 4,130,234

[45] Dec. 19, 1978

[54] COMBINED THROWAWAY CONTAINER OF CARDBOARD AND PLASTIC MATERIAL WITH A RIGIDLY FLANGED APERTURE RIM OR LIP

[75] Inventor: Werner Schmidt, Hamburg, Fed. Rep. of Germany

[73] Assignee: Maschinenfabrik Rissen GmbH, Hamburg, Fed. Rep. of Germany

[21] Appl. No.: 864,399

[22] Filed: Dec. 27, 1977

[30] Foreign Application Priority Data

Jan. 5, 1977 [DE] Fed. Rep. of Germany ....... 2700230

[51] Int. Cl.² .............................................. B65D 3/04
[52] U.S. Cl. .................................................. 229/1.5 B
[58] Field of Search ....................................... 229/1.5 B

[56] References Cited

U.S. PATENT DOCUMENTS

| 3,079,027 | 2/1963 | Edwards | 229/1.5 B |
| 3,137,431 | 6/1964 | Crouse et al. | 229/1.5 B |
| 3,182,882 | 5/1965 | Aellem | 229/1.5 B X |
| 3,580,468 | 5/1971 | McDevitt | 229/1.5 B X |
| 4,016,327 | 4/1977 | Fumei | 229/1.5 B X |

Primary Examiner—Davis T. Moorhead

[57] ABSTRACT

A composite cup, including an inner container of thermoplastic material bonded to an outer container of fibrous material, is provided with a rounded lip which tends to stay tightly rolled after formation, thereby strengthening the cup and facilitating the placement of a lid on the cup. After forming the cup, the inner thermoplastic material is trimmed off beyond the edge of the outer fibrous material. The projecting thermoplastic material tends to overlap the fibrous material and impede the absorption of moisture by the cut edge of the fibrous material. After the rolled edge of the cup is formed, shrinkage forces in the projecting thermoplastic material help to retain the edge of the cup in a tightly rolled configuration.

2 Claims, 3 Drawing Figures

COMBINED THROWAWAY CONTAINER OF CARDBOARD AND PLASTIC MATERIAL WITH A RIGIDLY FLANGED APERTURE RIM OR LIP

BACKGROUND OF THE INVENTION

The present invention relates to a combined cup for beverages or packing material that consists of an external fibrous material container, made e.g. of cardboard, or impregnated or laminated paper and a thin-walled container of thermoplastic sheeting or film which is drawn or inserted into this cardboard container. Such containers are, for instance, the subject matter of German Pat. No. 1 761 693, which, besides other teachings, proposes to carry out the formation of the rounded cup lip or rim, after the deep drawing process has taken place, by means of which the plastic container is drawn into the paper container, jointly with the paper container and the plastic container. In the course of forming the rounded lip the difficulty arises that the rounded lip, after some time has elapsed, frequently unrolls itself again. A rolled lip that has been rolled up correctly and tightly makes a significant contribution towards strengthening the container. It renders possible a saving in both cardboard weight and cardboard wall thickness. However, this strengthening is cancelled or lost again when the tightly rolled rounded lip unrolls itself again. Moreover, when the rounded lip undergoes any change, the outer dimension of the container frequently changes as well, which may result in difficulties when fitting a lid, an operation which only takes place at the filling station, after the container has been transported through entirely different climatic conditions and through various degrees of atmospheric humidity.

It is the object of the present invention to eliminate this shortcoming. In this connection one starts from the finding that the unrolling or rolling back of these rounded lips is to be ascribed to two causes as detailed below.

1. The atmospheric humidity penetrates through the front side of the cardboard at the rounded lip. In most cases involving modern technology, the cardboard is, at least on the inside, provided with a coating that is both airproof and impervious to liquids, e.g. a coating of polyethylene and the outside is also protected either by the application of a suitable surface pressure or by a surface varnishing or also merely by an application of chalk which results in a smooth surface being obtained which prevents the atmospheric humidity from so readily penetrating into the cardboard. However, the cutting edge at the topmost portion of the blank from which the cup was produced, the portion that is utilized for the formation of the rounded lip and, even when the rounded lip is rolled up tightly, this cutting edge nevertheless remains exposed to the atmosphere without any protection. Added to this is the circumstance that, due to the cut, the fibres of the paper have been cut through as well and, as a consequence hereof, they have acquired certain hygroscopic properties, thus directly attracting the humid outside atmosphere. If moisture now penetrates into the cardboard at the location of the rounded lip, the fibres swell up, the lengths within the cardboard increase and the rounded lip thus assumes a position in which it is possible for the upper edge to be larger. Consequently, it unrolls itself again.

2. The second cause is provided by the resilient properties of the plastic sheeting. Already during the deep drawing process the plastic sheeting is subjected to certain thermal processes as well as to tensile and deformative stresses which, in turn, lead to internal stresses arising in the sheeting. As soon as the sheeting is exposed to a more substantial temperature fluctuation, for instance, while being transported or when being filled with hot contents, or on other occasions, these stresses are set free and the sheeting attempts to shrink. This shrinkage does then under certain circumstances likewise lead to the rounded lip unrolling itself again if no specific provision is made that is aimed at causing the shrinkage forces to result in a strengthening of the flanging rather than in an increase in size.

As it is, the invention teaches that the internal inset of plastic material is not to be cut off exactly flush with the upper rim of the paper cup, but that the inner cup is left longer by approximately 2 mm; at least, however, by double the paper thickness. To begin with, this does contradict what is being normally aimed at, since ordinarily it is assumed that such a thin, projecting flap would be more likely to tend to have an impeding effect. Thus all kinds of special mechanical measures have been taken to ensure that the sheeting is actually cut off as flush as possible with the cup rim. If, however, the sheeting is allowed to project somewhat over the cup rim, then it is possible to eliminate both causes of the rounded lip unrolling itself by means of this measure and, to be more precise, in that the flap wraps itself around the front edge of the cardboard cup when warmth or heat is applied for the first time due to shrinkage forces and, in this manner, protects said front edge against the penetration of humid air. However, once the rounded lip has then been formed, the shrinkage forces, when heat is applied for a second time, act upon the sheeting portions inside the rounded lip and these, in turn, act in part antagonistically in relation to each other. That portion which is located above the rounded lip will, due to shrinkage, be drawn towards the center axis of the cup and is, on account of this, going to attempt to unroll the rounded lip again, while the lower portion, which is likewise drawn towards the centre axis due to shrinkage, will be tightening the rounded lip more firmly again. The projecting flap will now confer a predominance to the tightening portion of the rounded lip, so that the tightening forces will gain the upper hand and will consequently strengthen the rounded lip. This process will be explained with the aid of the following figures.

The process takes place as described in the following.

Figure 1:
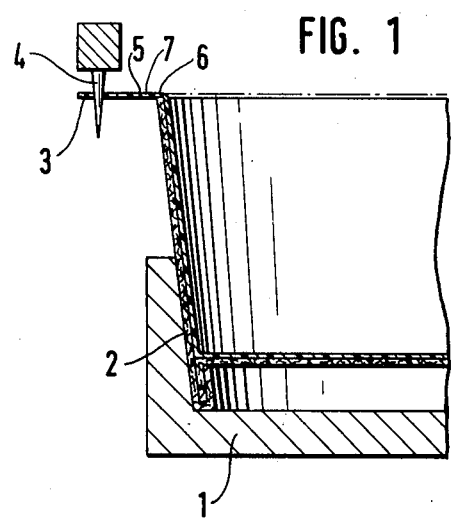
FIG. 1 shows a section through a combined cup.
Figure 2:
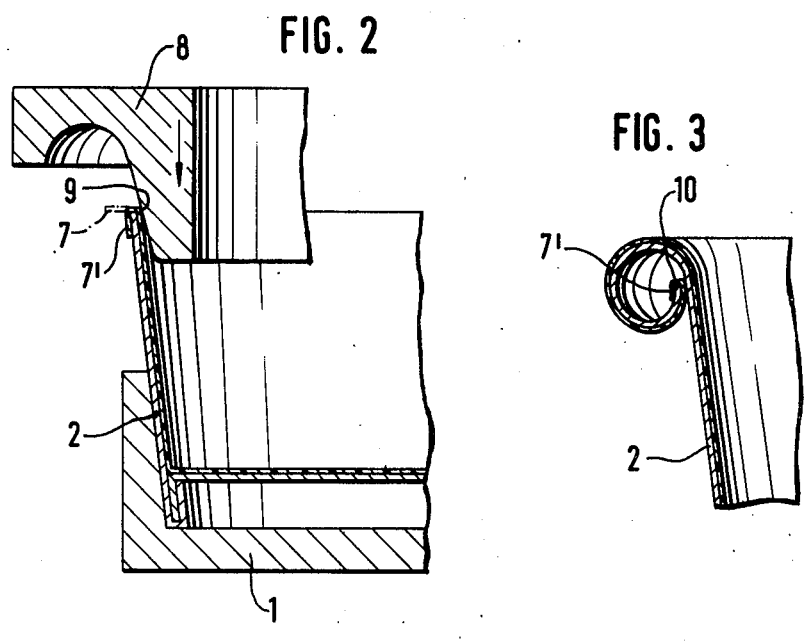
FIG. 2 shows the same section represented schematically in conjunction with a tool that forms the rounded lip.
Figure 3:
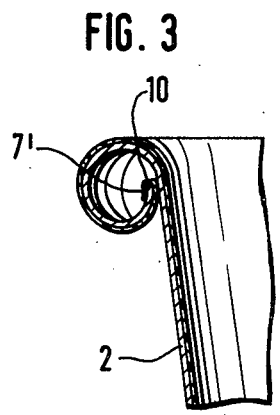
FIG. 3 shows a partial section through the upper edge of the flanged container.

The paper cup or the fibrous material container 2 is inside a metallic forming or shaping pot 1. The cup, together with the shaping pot 1, has arrived in the deep drawing station on a mechanical unit operating from station to station; the cup has reached the deep drawing station flush with a piece of sheeting 3 which, in a known manner, is impaled upon a needle board 4 and has, in the meantime, been brought to deep drawing temperature. In this station, the sheet is, by means of mechanical, compressed air and, if required, vacuum forces, drawn into the cup 2 so as to cause it to adhere in its entirety to the walls of the cup. On its bottom side the sheeting is coated with an adhesive mass, e.g. with so-called "Hot Melt". This "Hot Melt" is a kind of wax which, when in a hot state, becomes tacky and when being pressed closely against or when resting against the cup wall, immediately adheres to the same. Upon termination of this deep drawing operation the sheeting is now cut off with the aid of a rotary knife or, if the cup is not circular, a knife that follows the exact outline. In the course of this cutting operation, the cut according to the invention is not, as conventionally customary, performed at 6, but at 5, so that a rim or flap 7 projecting vertically from the cup remains. As illustrated in FIG. 2, this cup, which is now provided with this verticallly projecting flap 7 is, in a next station, brought into contact with a tool 8 designed to form the rounded lip, which is shown here merely diagrammatically. The rounded lip forming tools 8 are warmed only slightly so that the flap 7 arrives in position 7' due to shrinkage effects and thereby seals the upper edge of the fibrous material. However, care must be taken in this operation that the temperature is raised for very short periods only and that it is kept relatively low so that solely the shrinkage effect is brought about, but that no thermoplastic action becomes already effective on the sheeting, as this would greatly increase the friction at 9 and the formation of the rounded lip would be rendered substantially more difficult. The cup with flanged rim or lip being produced from now on after completion of the operation shown in FIG. 2, is illustrated diagrammatically in FIG. 3. In this Figure the advantages described in the foregoing can be seen distinctly. The layer of sheeting that is glued firmly onto the paper container with the aid of the "Hot Melt" material, has wrapped itself around the upper front surface 10. The flap 7 or 7' is located bonded fast on the rounded lip and is no longer capable of displacing itself against the same. If an additional heating takes place now, something for which an allowance has no longer to be made on friction surfaces in this finished state, then the rounded lip will contract still further and will under no circumstances unroll itself when starting from the circumstance that the sheeting is subjected to shrinkage forces and that it is the very flap 7' which leads to a predominance of those forces which contract the rounded lip.

I claim:

1. A combined cup for beverages or packing material that consists of an external container of cardboard or other fibrous material and an inner, preferably bonded or welded-on thin-walled container of thermoplastic material, the two container portions of which are flanged with one another, characterized in that the inner container is the longer by at least double the wall strength of the external container and in that the rim portion of the inner container projecting thereby at the aperture side, prior to the flanging operation, is wrapped around the edge of the flanged rim or lip (10) of the external container.

2. A combined cup as claimed in claim 1, characterized in that the flanged aperture rim or lip is strengthened in such a way by a thermal treatment effective after the completion of the flanging operation that it is no longer capable of unrolling itself.

* * * * *